Patented Apr. 7, 1936

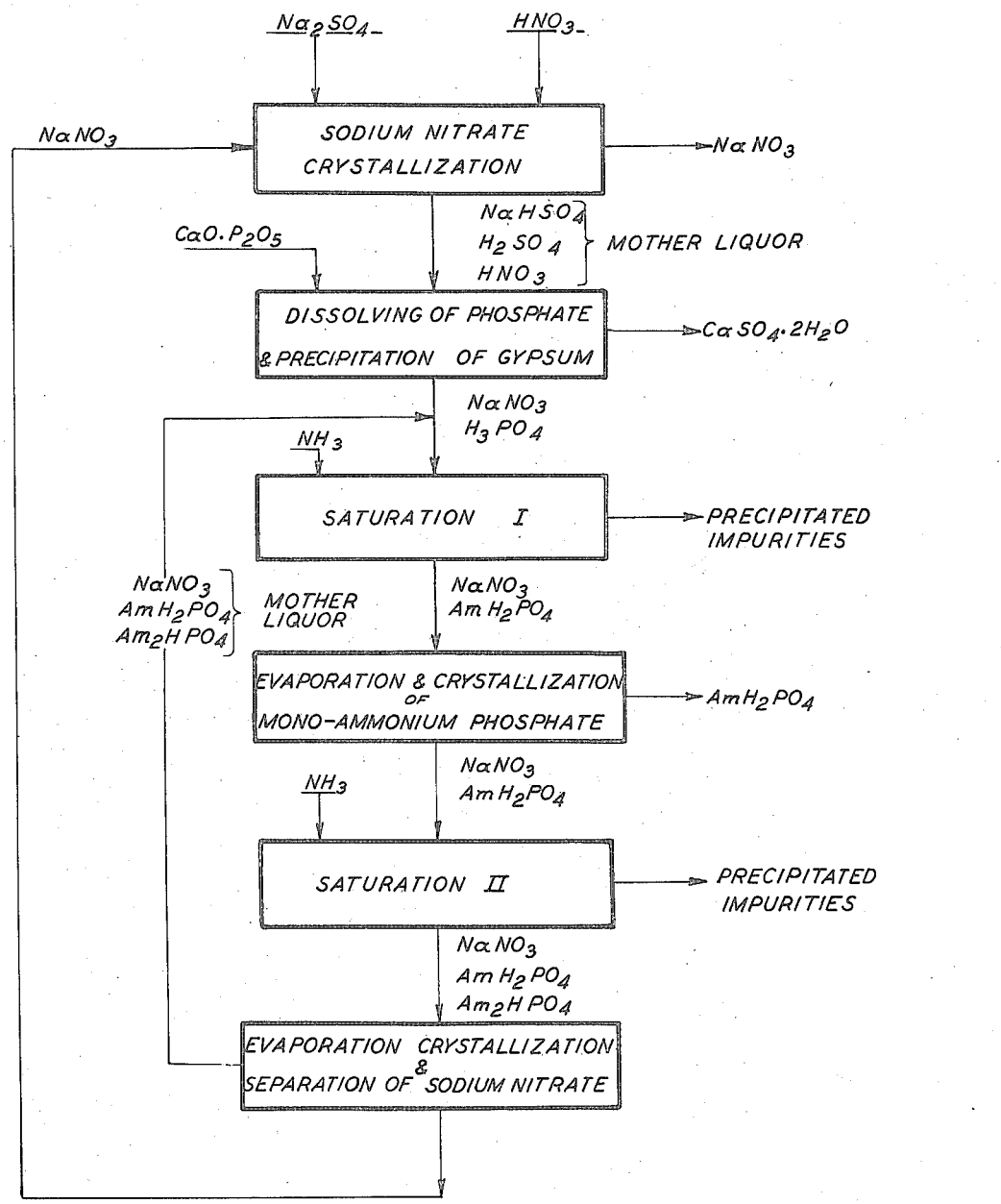
FLOWSHEET 1

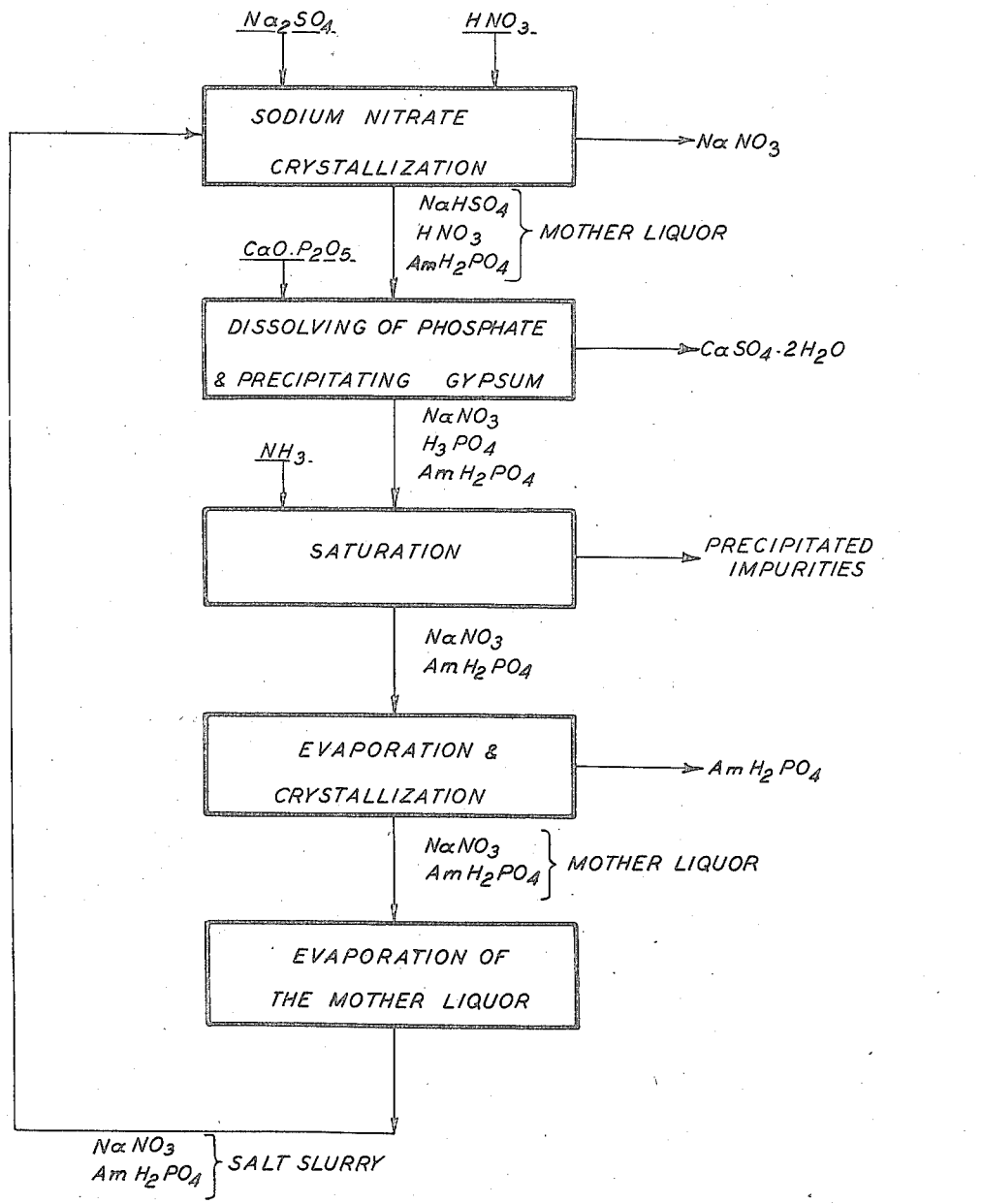

2,036,244

UNITED STATES PATENT OFFICE 2,036,244

METHOD OF PRODUCING PHOSPHATES

Bengt Wadsted, Copenhagen, Denmark, and Markus Larsson, Berlin, Germany

Application May 26, 1933, Serial No. 672,954
In Germany May 27, 1932

9 Claims. (Cl. 23—107)

This invention relates to the treatment of phosphate rock for the production of phosphoric acid and phosphates. Its objects are to improve the efficiency of present processes, to reduce the costs of carrying out the processes, to use cheaper materials, to produce more usable by-products, to improve the separability of some of the reaction products, and other objects which will hereinafter appear.

One feature of this invention involves the preparation of leaching liquor for the phosphate rock which comprises treating an alkali sulfate such as sodium or potassium sulfate with nitric acid whereby a crystalline alkali nitrate is formed that is readily removable from its mother liquor consisting of alkali bisulfate, sulfuric and nitric acids. This mother liquor from which the crystalline nitrate has been removed is used to leach the phosphate rock.

Another feature involves the leaching step wherein the rock is treated with the mother liquor just described under conditions which prevent the formation of an insoluble double salt, namely by maintaining the sodium ion concentration in the solution below a maximum limit whereby there is precipitated a substantially pure calcium sulfate which is easily separable from the other reaction products. After separation, the remaining solution is neutralized with ammonia whereby there becomes present in the solution a single ammonium phosphate usually mono, and sodium nitrate.

A still further feature of the invention involves the separation of the ammonium phosphate and the sodium nitrate so produced which comprises carrying out this procedure in several steps which include evaporating and cooling the mass to a point where a large part of the mono-ammonium phosphate crystallizes out. The crystallized phosphate is separated from its mother liquor. The liquor is then neutralized with ammonia to convert about half of the remaining mono-ammonium phosphate therein into di-ammonium phosphate. The sodium nitrate is crystallized and removed and the mother liquor containing ammonium phosphate and some sodium nitrate may be returned to the process or further treated for separation.

The invention contains other features of advantage which will be apparent from a reading hereof, and it is illustrated in the accompanying drawings wherein typical flow-sheets of the process are shown.

Flowsheet 1 illustrates diagrammatically the steps used in the crystallization of mono-ammonium phosphate from a solution containing sodium nitrate followed by crystallization of sodium nitrate from a mixture of mono and di-ammonium phosphates. Fig. 2 illustrates diagrammatically the steps used in the crystallization of mono-ammonium phosphate from a solution containing sodium nitrate.

It has previously been suggested that rock phosphate be treated with nitric acid and alkali sulfate according to the following reaction:

(I) $Ca_3(PO_4)_2 + 6HNO_3 + 3Na_2SO_4 =$
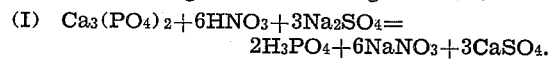
$2H_3PO_4 + 6NaNO_3 + 3CaSO_4.$ The reaction which actually takes place when treating ordinary rock phosphate, on account of the higher proportion of CaO to $P_2O_5$ due to lime in the rock phosphate will be approximately as follows:

(II) $4CaO.P_2O_5 + 8HNO_3 + 4Na_2SO_4 =$
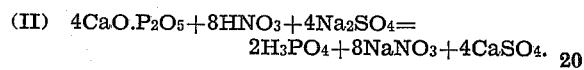
$2H_3PO_4 + 8NaNO_3 + 4CaSO_4.$ One of the main difficulties in this reaction is the formation of the insoluble double salt of sodium-calcium-sulfate. In order to avoid the formation of such double salts it is necessary to work in fairly dilute solutions. As the sodium sulfate to be used for this reaction, as a rule is present in anhydrous form, and the nitric acid as approximately a 50% solution, very much larger amounts of water must be added to the reaction than necessary merely for complete washing of the precipitated $CaSO_4$.

These difficulties are overcome by using a special mother liquor to be described hereinafter for leaching the phosphate rock and producing a solution of $NaNO_3 - H_3PO_4$. That is if the phosphate rock is treated with a liquor according to the following equation:

(III) $4CaO.P_2O_5 + 3NaHSO_4 + 3HNO_3 + H_2SO_4 =$
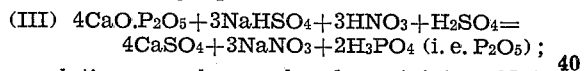
$4CaSO_4 + 3NaNO_3 + 2H_3PO_4$ (i. e. $P_2O_5$);

a solution can be produced containing 25% $NaNO_3$ and 13.9% $P_2O_5$. As the formation of insoluble double salt is dependent only on the sodium ion concentration in the solution, the $SO_4$ and Ca ion concentrations being constant, the advantage of this method can easily be proven.

Since the sodium ion concentration in solution must be maintained below a limit to prevent the precipitation of sodium calcium sulphate while assuring the precipitation of pure calcium sulphate, and since the proportion between the $P_2O_5$ concentration and $NaNO_3$ concentration in solution according to reaction II cannot exceed 142:680=1:4.8 there is obtained a solution of comparatively very low P₂O₅ concentration. Tests have shown that it is only safe to produce a solution containing as a maximum 25% NaNO₃ without formation of insoluble double salts so when operating according to the previously proposed method, the solution would contain only 5.3% P₂O₅. The cost of evaporating the solution obtained after neutralization with ammonia is therefore one of the chief disadvantages of the process described. A simple calculation will show that in order to produce dry products about 12 tons more water per ton P₂O₅ must be evaporated in reaction II as compared with reaction III, so that reaction III results in a very large saving in the production cost.

In the preparation of the leaching liquor, although it has been understood in general that alkali sulfate, such as Na₂SO₄ or K₂SO₄ could be treated with HNO₃ to give a fairly large amount of alkali nitrate in crystalline form and a mother liquor of alkali bisulfate and nitric acid; it has not been definitely known how the alkali nitrate could be effectively prepared in concentrated form without corroding the reaction vessels and without the precipitation of acid alkali sulphates.

In processes heretofore used for treating alkali sulfates with nitric acid to produce alkali nitrate and a solution consisting essentially of an acid alkali sulphate and nitric acid, nitric acid of suitable concentration is brought into contact with alkali sulfate with heating so that the alkali sulfate goes into solution. This is followed by a separate step of cooling to crystallize alkali nitrate.

The difficulty in carrying this process out in practice consists in the fact that it is almost impossible to obtain a metal suitable for the construction of a cooler necessary for the above described heat removal, which is due to the fact that the solution reacts upon metals as free nitric acid and free sulphuric acid. The cooling of a reaction mixture from which large amounts of salts crystallize out has always been a difficult problem and especially in this case where the solution itself is highly corrosive towards almost all metals. Finally, the tendency of an acid alkali sulfate to precipitate has been a serious difficulty.

The surprising observation was made that solid sodium sulfate reacts very rapidly and completely with HNO₃ even at low temperature whereby almost chemically pure sodium nitrate crystallizes. This did not take place with other alkali salts e. g. K₂SO₄, KCl, etc.

By cooling the nitric acid to between $-10°$ C. and $-15°$ C., it is possible to obtain a mixture with a temperature of about $+10°$ C. At this temperature it is possible to crystallize out about 50% of the added sodium in Na₂SO₄ as NaNO₃ and all the NaNO₃ returned with the evaporated mother liquor.

This is due to the circumstance that sodium sulphate dissolves rapidly in the reaction mixture preventing the sodium sulphate crystals from being covered with precipitated sodium nitrate. According to this discovery it appears that it is unnecessary to introduce heat into the system and sufficient that the removal of the reaction heat between sodium sulphate and nitric acid takes place preferably by cooling of the nitric acid before this is introduced into the reaction. According to the present invention the reaction is carried out as follows: The nitric acid necessary for the reaction is cooled to such a temperature that the reaction mixture of nitric acid and sodium sulphate reaches the temperature desired e. g. around 20° C. This can be carried out in any ordinary nitric acid cooler. The most favourable final temperature in order to obtain a high recovery of sodium nitrate and avoiding crystallization of sodium bisulphate depends in each individual case on the proportion between sodium sulphate, nitric acid and water in the reaction mixture. It was found that if work proceeded according to the reaction:

(IV) $4Na_2SO_4 + 8HNO_3 = 5NaNO_3 + 3NaHSO_4 + H_2SO_4 + 3HNO_3$ it is desirable that a final temperature of about 20° C. is reached while if a large excess of nitric acid is worked with, the recovery of precipitated sodium nitrate can be largely increased by primary strong cooling of the nitric acid. An essential point about the process is in all cases that no heat is introduced into the reaction and that all heat removal is done by preliminary cooling of the nitric acid. The above described statements refer to the application of anhydrous sodium sulphate and ordinary nitric acid from an ammonia oxydation nitric acid plant containing about 50% HNO₃. However, the process can also be carried out by application of nitric acid of higher or lower concentration and by application of other sodium sulphate containing materials. The sodium nitrate crystallizing may be separated from the mother liquor by means of an acid proof centrifuge and may be treated with a slightly alkaline liquor in order to remove the last traces of acid from crystals. The mother liquor consisting of a solution of sodium sulphate, sulphuric acid, and nitric acid can either be neutralized directly with ammonia in order to produce ammonium sulphate-ammonium nitrate (NH₄)₂SO₄.2NH₄NO₃ or be used for the treatment of rock phosphate for the production of a solution essentially consisting of phosphoric acid and sodium nitrate and precipitated calcium sulphate.

In order to obtain a coarse crystalline sodium nitrate it is desirable to introduce the nitric acid and the sodium sulphate continuously to the reaction and to thicken the suspension which overflows the reaction vessel by means of a decanting thickening device such as a cone whereafter the discharge from the cone is partly returned to the reaction vessel. Through the presence of a large amount of crystals during the reaction between sodium sulphate and nitric acid, a coarser product is obtained.

In order to produce a uniform product it may be desirable to send the reaction mixture to a classifier device such as a Dorr classifier in which the separation of coarser crystals from finer crystals takes place. The overflow from this classifier may enter a thickening cone or a Dorr thickener, the underflow from which consists of the finer crystals suspended in a comparatively small quantity of liquor being returned to the reaction. The crystals in the classifier rake product may be separated from adherent mother liquor such as by means of a centrifuge and washed with a slightly alkaline wash liquor.

This mother liquor consisting essentially of a solution of acid sodium sulphate and nitric acid is used in reaction III for the treatment of rock phosphate. The treatment of rock phosphate according to this reaction is preferably carried out at a reaction temperature of about 50° C., but even at a lower reaction temperature, good extraction of the P₂O₅ available in the rock phosphate is obtained. It is further pointed out that good extraction of P₂O₅ is obtained even if the mother liquor originating from reaction IV does not correspond exactly to the CaO present in the rock phosphate, but is present in deficit, for instance 7 hydrogen ions to 4CaO. The solution produced according to reaction III contains per mol. P₂O₅ only 3 mol. sodium nitrate or a proportion of 142:255 or 1:1.8.

It is therefore possible without formation of double salt to produce a solution with a P₂O₅ concentration which is 2-3 times higher than the P₂O₅ concentration obtained according to Equation II, whereby the amount of water which must be evaporated from this solution after neutralization is reduced to between one half and one third.

After separation and washing of the calcium sulphate precipitated according to reaction III the solution produced is neutralized with ammonia to such an extent that the P₂O₅ in solution is available as monoammonium phosphate. After separation of the precipitated impurities the solution is evaporated and will, if necessary, through cooling give an ample crystallization of almost pure monoammonium phosphate. When treating certain kinds of rock phosphates it may be desirable to neutralize the solution obtained from reaction III somewhat further with ammonia in order to precipitate all impurities. While a pure monoammonium phosphate is obtained in this crystallization step, it is not possible to obtain a complete separation of all the monoammonium phosphate from the sodium nitrate in such a solution.

If phosphate rock is leached with a solution of the composition $4NaHSO_4 + 4HNO_3$, a solution is obtained which after neutralization and evaporation will contain $4NaNO_3$ per $2AmH_2PO_4$. If this solution is cooled down to 20° C. at a concentration, where NaNO₃ will not crystallize, nearly 50% of the AmH₂PO₄ crystallizes out. The mother liquor then consisting of 1.1 mol. AmH₂PO₄ and 4 mol. NaNO₃ can be evaporated to a very high concentration of around 80% salts.

The desirable separation of monoammonium phosphate and sodium nitrate from the remaining solution containing these two salts presents great difficulties, which difficulties are accounted for by the almost parallel curves of solubility of the two salts in their common solution. While the curve of solubility of monoammonium phosphate in water is considerably steeper than the curve of solubility of sodium nitrate in water, the curve of solubility of monoammonium phosphate, respectively of sodium nitrate in a solution saturated with both components are almost parallel.

After separation of calcium sulphate and neutralization of the solution with ammonia to a degree of neutralization corresponding to monoammonium phosphate the solutions which are obtained from the above two reactions II and III would correspond to $2NH_4H_2PO_4 - 8NaNO_3$ and $2NH_4H_2PO_4 - 3NaNO_3$. The separation of the two salts from the solution obtained from reaction III is difficult in spite of the fact that the conditions are more favourable than if the separation should be carried through from the solution according to reaction II. If the sodium nitrate is separated at a temperature of 60° C. and the monoammonium phosphate at a temperature of 20° C. which by itself is a logical procedure water would have to be introduced to the mother liquor obtained through the separation of sodium nitrate before cooling this mother liquor to 20° C. in order not to exceed at the same time the solubility of sodium nitrate. On account of the almost parallel running curves of solubility large quantities of mother liquor must be circulated. The circulation of these large quantities of mother liquor and the introduction of water which has to be evaporated later are disadvantages which make commercial separation of the two salts by this method impossible.

The observation was made that if a solution which is saturated at a certain temperature with sodium nitrate and monoammonium phosphate and in which the P₂O₅ available is present as mono-ammonium phosphate only, is neutralized further with ammonia to such a point that the P₂O₅ available is present approximately half as diammonium phosphate half as monoammonium phosphate large quantities of mono as well as diammonium phosphate can be dissolved in the solution obtained by this additional neutralization. The solubility of sodium nitrate based upon the same quantity of water is hardly changed by this operation. The following example may clarify this: A solution which at 60° C. on 100 g. water contains 124 g. sodium nitrate and about 67 g. monoammonium phosphate and at this temperature is saturated with both salts was treated with so much ammonia that about half of the P₂O₅ available was neutralized to diammonium phosphate. Thereafter it was possible to dissolve a further quantity of about 71 g. monoammonium phosphate and about 70 g. diammonium phosphate all based on about 100 g. of water in solution. The new solution thereby obtained which was saturated at 60° C. with sodium nitrate, monoammonium phosphate and diammonium phosphate contains the following amount of salts based on 100 g. of water: sodium nitrate 124 g. monoammonium phosphate 105 g. and diammonium phosphate 108 g. This solution consequently contains three times as much P₂O₅ at approximately the same content of sodium nitrate and monoammonium phosphate only. The observation described forms one feature of the present invention, according to which the separation of the two salts from their solution is easily performed. According to this feature the solution consisting essentially of phosphoric acid and sodium nitrate is neutralized with so much ammonia that the P₂O₅ in solution is present as monoammonium phosphate only. Thereafter the solution is if necessary evaporated and cooled whereby monoammonium phosphate crystallizes. After separation of the monoammonium phosphate the mother liquor is neutralized with ammonia to a point where approximately half of the monoammonium phosphate is converted into diammonium phosphate, whereupon the solution is evaporated to crystallization of sodium nitrate and if necessary cooled. The cooling of this solution can however, only be carried to a certain point because a crystallization of disodiumphosphate would otherwise occur along with sodium nitrate. After separation of the sodium nitrate the mother liquor obtained is mixed with the acid solution not yet neutralized with ammonia or in other words cycled. It is obvious that if the proportion of NaNO₃ in the original solution is very high it may be desirable to neutralize part of this original solution with ammonia to a mixture of mono and diammonium phosphate in order to separate sodium nitrate first and that after separation of the sodium nitrate the mother liquor is neutralized with the balance of the acid liquor or with nitric acid to such a point that all of the $P_2O_5$ in the solution is present as mono-ammonium phosphate. By this procedure only the sequence of operation is varied but nothing fundamental in the process.

The crystallized mono ammonium phosphate may be separated by means of a centrifuge and the mother liquor evaporated to crystallization and the crystallizing material consisting of sodium nitrate, ammonium phosphate and a small quantity of ammonium sulphate may be introduced to reaction IV with or without separation of the adherent mother liquor. In case the mother liquor is separated this mother liquor can either directly return to the evaporation process just described or to the evaporation ahead of the monoammoniumphosphate separation. Through the process just described a mixture of sodium nitrate and ammonium phosphate is introduced in the reaction IV. Since the reaction mixture in this reaction is already saturated with sodium nitrate the sodium nitrate introduced by the crystalline mixture of sodium nitrate and ammonium phosphate remains undissolved while the mono ammonium phosphate goes into solution. It is therefore made possible through this process to remove all the sodium entering into the process as a pure sodium nitrate from the reaction IV.

Through the dissolution of monoammonium phosphate just described a certain amount of this compound is circulated through all other reactions. It may under certain circumstances be desirable to reduce the circulation of monoammonium phosphate to a minimum. In order to accomplish this the process may be varied as follows: The solution obtained after separation of monoammonium phosphate is neutralized with ammonia to such a point that about half of the $P_2O_5$ is available as diammonium phosphate and half as monoammonium phosphate. After evaporation and if necessary cooling of this solution almost pure sodium nitrate is crystallized. A crystallization of monoammonium phosphate does not take place on account of the high solubility of this composition in a solution of mono and diammonium phosphate. The sodium nitrate crystallizing from this operation can still after separation of the mother liquor be introduced into reaction IV for further purification. The mother liquor which after separation of the more or less pure sodium nitrate consists of a solution saturated with sodium nitrate at the temperature in question and a solution of ammonium phosphate may preferably be mixed with a solution obtained from reaction III after separation of the calcium sulphate.

*Example I*.—In an acid proof heat insulated agitator 56.8 kg. $Na_2SO_4$ was simultaneously mixed with 100.8 kg. 50% $HNO_3$. The nitric acid was cooled before the addition to about 0° C. The temperature of the mixture was during the mixing period constant at about 15° C. 42.5 kg. $NaNO_3$ crystallized out, was centrifuged and washed with some sodium nitrate solution. The dried salt had a purity of more than 99% $NaNO_3$.

*Example II*.—In an acid proof heat insulated agitator 56.8 kg $Na_2SO_4$ was simultaneously mixed with 97.7 kg 52% $HNO_3$. In the beginning of the mixing period a moist salt mixture was added, having the following composition: 25.5 kg $NaNO_3$, 5.7 kg $AmH_2PO_4$ and 1.8 kg $H_2O$. The nitric acid was before addition cooled to about 0° C. The temperature of the mixture was at the end of the mixing period 15° C. 65.5 kg $NaNO_3$ crystallized out, the crystals were separated by centrifuging from the mother liquor and the adhering solution displaced by a slightly alkaline sodium nitrate solution. The dried product contained more than 99% $NaNO_3$, and only traces of $P_2O_5$.

*Example III*.—284 g $Na_2SO_4$ and 458 g $HNO_3$ (55%) were mixed at a temperature of 25° C. The obtained mother liquor contained 6.8% Na, 35.6% $SO_4$ and 18.5% $NO_3$ showing that CA 60% of the added Na had crystallized as $NaNO_3$.

*Example IV*.—568 g $Na_2SO_4$ and 1332 g $HNO_3$ (52%) were mixed at a temperature of 0° C. The obtained mother liquor contained 28.7% $SO_4$, 2.81% Na and 20.6% $NO_3$. The reaction had consequently taken place according to the following equation:

$$4Na_2SO_4 + 11HNO_3 \rightarrow 6.36NaNO_3 (crystals) + 0.82Na_2SO_4 + 3.12H_2SO_4 + 4.64HNO_3;$$

and about 80% of the added Na had crystallized as $NaNO_3$.

*Example V*.—568 g $Na_2SO_4$ and 1695 g $HNO_3$ (52%) were mixed at a temperature of $-10°$ C. The obtained mother liquor contained 22.8% $SO_4$, 1.62% Na and 26.3% $NO_3$. The reaction had consequently taken place according to the equation:

$$4Na_2SO_4 + 14HNO_3 \rightarrow 6.8NaNO_3 (crystals) + 0.6Na_2SO_4 + 3.4H_2SO_4 + 7.2HNO_3:$$

and 85% of the added Na had crystallized as $NaNO_3$.

We claim:

1. The process of treating phosphate rock which comprises treating the rock with nitric acid and sodium bi-sulfate, separating out the resulting calcium sulfate from the remaining solution, neutralizing said solution with ammonia to produce a solution of ammonium phosphate and sodium nitrate, separating crystallized mono-ammonium phosphate therefrom at a degree of neutralization corresponding to mono-ammonium phosphate while separating the sodium nitrate at a degree of neutralization corresponding to a higher alkalinity.

2. The process of treating phosphate rock which comprises mixing sodium sulfate and nitric acid whereby sodium nitrate is precipitated, removing the precipitated sodium nitrate from its mother liquor, using the mother liquor for attack of phosphate rock, separating out the resulting calcium sulfate from the remaining solution, neutralizing said solution with ammonia to produce a solution of mono-ammonium phosphate and sodium nitrate, separating the mono-ammonium phosphate therefrom at a degree of neutralization corresponding to mono-ammonium phosphate while separating the sodium nitrate at a degree of neutralization corresponding to a higher alkalinity.

3. The process according to claim 2 wherein the separation of the sodium nitrate takes place in a solution in which the $P_2O_5$ available is present approximately half as mono- and half as di-ammonium phosphate.

4. The process for the separation of ammonium phosphate and sodium nitrate from solutions of a mixture thereof comprising crystallizing out ammonium phosphate at a degree of neutralization to produce substantially entirely mono-ammonium phosphate while the sodium nitrate is separately crystallized out at a degree of neutralization intermediate between mono- and di-ammonium phosphate.

5. The process for the separation of ammonium phosphate and sodium nitrate from solutions of a mixture thereof comprising evaporating and crystallizing out sodium nitrate at a degree of neutralization intermediate between mono- and di-ammonium phosphate and then neutralizing the remaining solution to a degree corresponding to mono ammonium phosphate.

6. The process for the separation of ammonium phosphate and sodium nitrate from solutions of a mixture thereof comprising crystallizing out ammonium phosphate at a degree of neutralization to produce substantially entirely mono-ammonium phosphate removing the so-produced crystals from their mother liquor, neutralizing the mother liquor to a degree of alkalinity to make the $P_2O_5$ therein available substantially half as mono- and half as di-ammonium phosphate and then separating the sodium nitrate from said liquor.

7. The process of treating phosphate rock which comprises reacting upon the rock with a solution, containing sodium bisulfate and nitric acid, obtained by reaction between sodium sulfate and nitric acid, separating the calcium sulfate so formed, neutralizing the resulting solution with ammonia to a degree corresponding substantially to mono-ammonium phosphate, precipitating and removing from their mother liquor crystals containing mono-ammonium phosphate, further evaporating the mother liquor to obtain crystals consisting essentially of sodium nitrate and mono-ammonium phosphate and returning said crystals to the reaction between sodium sulfate and nitric acid.

8. The process of treating phosphate rock which comprises reacting upon the rock with a solution containing sodium bisulfate and nitric acid, separating the calcium sulfate formed thereby, neutralizing the resulting solution, mainly consisting of sodium nitrate and phosphoric acid, with ammonia and concentrating to produce precipitated mono-ammonium phosphate from its mother liquor, evaporating the mother liquor and crystallizing mixed salts therefrom, and returning the resultant liquor to be mixed with the solution of sodium nitrate and phosphoric acid.

9. The process of treating phosphate rock which comprises reacting upon the rock with a solution containing sodium bisulfate and nitric acid, separating the calcium sulfate so formed, neutralizing the resulting solution, mainly consisting of sodium nitrate and phosphoric acid, with ammonia (and concentrating) to produce precipitated mono-ammonium phosphate, removing the precipitated phosphate from its mother liquor, neutralizing the latter mother liquor with ammonia to an extent that the $P_2O_5$ in solution is present approximately half as di-ammonium phosphate and half as mono-ammonium phosphate, evaporating said solution to crystallize therefrom material consisting essentially of sodium nitrate, and mixing the mother liquor from which said materia is crystallized with the solution of sodium nitrate and phosphoric acid.

BENGT WADSTED.
MARKUS LARSSON.